United States Patent [19]

Dickerson

[11] 4,221,607

[45] Sep. 9, 1980

[54] CALCINING EFFECT OF SYNTHETIC IRON OXIDE

[75] Inventor: Theodore Dickerson, Monroe, La.

[73] Assignee: Cities Service Company, Tulsa, Okla.

[21] Appl. No.: 23,478

[22] Filed: Mar. 23, 1979

[51] Int. Cl.$^2$ ............................................. C09C 1/24
[52] U.S. Cl. .................................................. 106/304
[58] Field of Search ............... 106/304; 252/62.59; 423/632, 633

[56] References Cited

U.S. PATENT DOCUMENTS

| | | | |
|---|---|---|---|
| 2,184,738 | 12/1939 | Fireman | 423/153 |
| 2,394,579 | 2/1946 | Ayers | 106/304 |
| 2,416,138 | 2/1947 | Ayers | 106/304 |
| 2,620,261 | 12/1952 | Toxby | 423/633 |
| 2,980,617 | 4/1961 | Ireland | 252/62.5 |
| 3,005,724 | 10/1961 | Seabright | 106/304 |
| 3,009,821 | 11/1961 | Bennetch | 106/304 |
| 3,650,783 | 3/1972 | Yates | 106/304 |
| 3,832,455 | 8/1974 | Smith et al. | 106/304 |
| 3,947,502 | 3/1976 | Leitner | 423/632 |
| 4,136,158 | 1/1979 | Okuda et al. | 423/632 |

*Primary Examiner*—O. R. Vertiz
*Assistant Examiner*—Mark Bell
*Attorney, Agent, or Firm*—George L. Rushton

[57] ABSTRACT

Copperas solution is purified and mixed with a silica-containing material, such as fumed silica. The mixture is then dried to give a monohydrate (FeSO$_4$.H$_2$O)/silica material. Calcination of this substance results in a copperas red oxide having improved color characteristics and lower losses due to uncalcined sulfate. The amount of silica added is 0.25–10 wt. %, based on the finished oxide product.

3 Claims, 1 Drawing Figure

U.S. Patent  Sep. 9, 1980  4,221,607
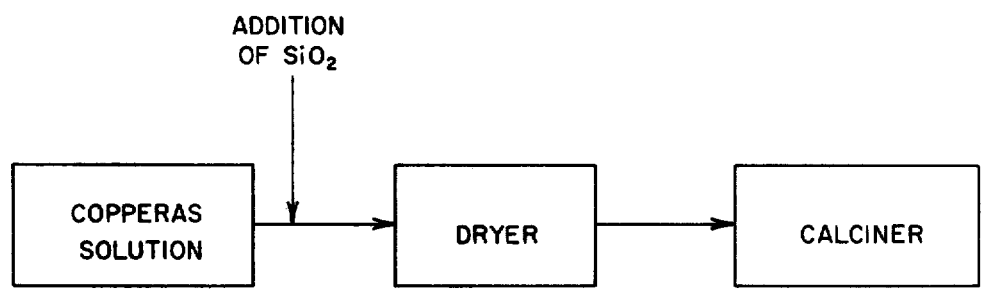

CALCINING EFFECT OF SYNTHETIC IRON OXIDE

BACKGROUND OF THE INVENTION

This invention relates to synthetic iron oxides. More particularly, the invention relates to synthetic red iron oxides prepared from soluble iron salts. More particularly, the invention relates to a method of improving the calcining effect when synthetic red iron oxide is prepared from soluble iron salts.

Iron oxide, either natural or synthetic, is a well-known pigment. Among the synthetic oxides are black, yellows, browns, tans, and reds. The black and brown oxides contain varying ratios of ferrous and ferric oxides. Yellow iron oxides are the monohydroate of ferric oxide. Tan oxides are a new class of iron oxide pigments, in which iron oxide is reacted with other metallic oxides to form a series of chemical compounds known as ferrites. For example, zinc ferrite theoretically contains 33.7% zinc oxide, but in practice from about 32% to about 34%, with the remainder being ferric oxide. Magnesium ferrite contains about 20% magnesium oxide. Synthetic red oxides can be made by 4 different methods. "Ferrite reds" are made by dehydrating the yellow oxide, thus converting the ferric oxide monohydrate to $Fe_2O_3$. Another method is to precipitate black or brown oxide and then calcine at red heat to the ferric oxide state. The third method gives what is often referred to as "precipitated reds", made by direct precipitation from a solution of ferrous salts. The fourth method makes roasted "copperas reds". Copperas ($FeSO_4.7H_2O$) is purified to remove other metallic salts and is then dehydrated to the monohydrate ($FeSO_4.H_2O$). The monohydrate is calcined (roasted) to give red alpha $Fe_2O_3$ (copperas red). The present invention is primarily concerned with improving the color characteristics of roasted copperas reds but is applicable to other synthetic iron oxides. "Copperas reds" are chosen as the preferred embodiment.

Prior art inventions in the field of iron oxide technology are exemplified by U.S. Pat. Nos. 2,184,738, 2,394,579, 2,416,138, 2,620,261 and 3,009,821.

As mentioned above, copperas reds are typically prepared by calcining ferrous sulfate monohydrate, obtained from copperas. The calcining conditions are important for the color of the finished synthetic red iron oxides, particularly in view of the fact that in a commercial operation, a series of different distinct reds ranging from a light red to a dark purple must be produced consistent with established color standards. The main parameter for controlling the desired shade of red to be produced is the calcining temperature; the lighter reds, which are desirable products, are made at lower temperatures. To produce the darker red product, the temperature is increased in distinct steps. It is noted, with existing commercial calcining equipment, that the production of the lighter shades of reds requires temperatures which are so low as to result in an incomplete reaction of the ferrous sulfate monohydrate. In other words, when producing light reds, the calcined product contains a high percentage of unreacted material, which, since it has to be removed in the washing step, represents a material loss. Moving to the darker shades of red by increasing the calcining temperature, these losses become subsequently less with each step towards the next darker shade of red.

Based on these observations, it becomes desirable to be able to produce the lighter shades of red at higher temperatures, thus reducing losses of raw materials and subsequent environmental problems.

The calcining effect involves two results: the shade of the red product produced and the amount of uncalcined material remaining in the product. A higher calcination temperature reduces the loss of raw material (uncalcined product), but it also forms a darker red product. If a lower loss of material is obtained for a given red color - or, conversely, if a lighter red color of product is obtained for the same material loss, then the calcining effect is improved.

The improvement of the calcining effect leads to these two desirable features. It gives, first, an iron oxide of a lighter shade than presently produced, with the material losses still being within reasonable limits. Second, the iron oxide pigments resulting from the improved calcining effect have a higher tinting strength, which is desirable for the end-user, inasmuch as the tinting strength of a pigment is a measure of how much red pigment is needed to be mixed with a white pigment, such as $TiO_2$, to arrive at a desired shade of color. Thus, a higher tinting strength means the end-user can produce a desired color with less red oxide pigment.

SUMMARY OF THE INVENTION

My invention overcomes, in large part, the disadvantages of the prior art mentioned above, in that lighter reds are produced at higher temperatures, thus giving a desirable product, with lower losses. My method of improving the calcining effect of synthetic iron oxide prepared from purified iron salts comprises the steps of: (a) adding a silicon-containing material selected from the group consisting of fumed silica and precipitated silica to the purified salt solution, (b) drying the mixture, and (c) calcining the mixture of step (b).

BRIEF DESCRIPTION OF THE DRAWING

A block diagram of the typical steps in the calcination of roasted copperas reds is shown in the FIGURE. Although there are further processing steps following the calcination, the process of the invention is shown in the FIGURE.

DESCRIPTION OF THE PREFERRED EMBODIMENT

The prior art preparation of synthetic red iron oxides is well known and will not be discussed here in detail. Reference is made to various topics concerning iron oxide, such as "Pigments (Inorganic)", found in the "Encyclopedia of Chemical Technology" By Kirk-Othmer.

The raw materials for the synthetic red iron oxides are broadly classified as soluble iron salts, exemplified by ferrous or ferric chloride, ferrous or ferric nitrate, and ferrous or ferric sulfate. These materials, in dry form, can be calcined to give the red alpha iron oxide, $Fe_2O_3$. A commercially-available and preferred soluble iron salt is industrial grade ferrous sulfate known as "copperas". A major source of copperas is the refining of titanium ores. Crude copperas is commercially obtained as moist acidic crystals, in which titanium is the major impurity. Various purification steps are known, such as the addition of metallic iron to a solution of crude copperas, thereby neutralizing a major portion of the acidity and raising the pH. As the pH increases, the titanium impurities precipitate out and the supernatant FeSO₄ solution is removed. This supernatant copperas solution can be used as the starting material for the present synthetic iron oxide process, or it can be purified further. Commercial copperas, with a specification of less than 0.2 wt. % metallic impurities, can be obtained as a solution or in a crystal form (FeSO$_4$.7H$_2$O). It is preferable to dry the copperas to the monohydrate form (FeSO$_4$.H$_2$O) before calcination. This drying can be done in any of a number of ways, such as spraying the copperas solution into a fluid bed dryer.

If copperas solution is the chosen starting material for the present process, a silica-containing material is added to the copperas solution. Agitation is useful to assure proper distribution of the silica. If moist copperas crystals are used, silica-containing material is added and mixed. The copperas-silica mixture is then dried to the monohydrate form.

The silica-containing material which is added to the copperas is selected from the group consisting of fumed silica and precipitated silica. These are well-known and commercially-available materials. The particle size of such a silica can vary from about 4 to about 20 millimicrons, with the preferred particle size being about 12–14 millimicrons. Since it is desirable to coat, at least partially, the iron oxide crystals, the particle size of the silica should be such that at least a partial coating is easily obtained.

The amount of silica-containing material which is added to the copperas ranges from about 0.25 wt % to about 10 wt %, based upon the finished iron oxide product. A preferred amount of silica-containing material to be added is in the range from about 0.4 wt % to about 6 wt %, and a most preferred range is from about 0.5 wt % to about 1.5 wt %. The method of mixing and agitation of the two components of mixture depends upon the physical state of the copperas and the drying means used. Broadly, the drying and mixing process is sufficient to produce monohydrate copperas crystals at least partially coated with silica.

The calcination, or roasting, of the monohydrate copperas results in the loss of water, decomposition of the sulfate, and the formation of synthetic red iron oxide crystals. The typical color of these crystals is red, with the shade of redness depending upon the calcination temperature and the residence time. Broadly, the temperature and the residence time are inversely related, in that a higher calcination temperature requires a shorter residence time and vice versa. The average residence time can be calculated, but it must be realized that some monohydrate crystals can proceed through the calciner without being sufficiently decomposed, while other crystals are subjected to "overburning", wherein they are subjected to the calcination temperature for a longer period of time than are the average crystals. This may take place when some crystals remain on or near the exposed surface of the bed in the calciner for more than the expected exposure time during the residence time in the calciner. Thus, the variation of the residence time is somewhat restricted. In a typical prior art calciner, the range of calcination temperature varies from about 1325° F. to about 1600° F., (718°–871° C.) in which the lower temperature gives a lighter red, accompanied by a higher loss of uncalcined material. Under typical operating practice, when a desirable residence time and calcination temperature are used, it is customary to have from about 5 to about 20 wt % of improperly calcined material in the output of the calciner, with the higher losses being associated with the lighter reds made at lower temperatures. A common procedure is to wet-grind the calciner output in water, which serves to dissolve the unconverted sulfate, while the red calcined particles are ground to a desired particle size range.

The invention concerns the calcination of a soluble iron salt and involves the relation of the calcination temperature, the resultant red color of the iron oxide product, and the losses resulting from the incompletely calcined feed material.

One effect of coating the monohydrate crystals with silica prior to calcination is to produce a lighter red oxide product at the same calcination temperature and residence time, as compared to the calcination of monohydrate crystals having no silica coating.

This effect can be better understood by using the following general example:

| | Product Color | |
| | (the higher the number, the darker red the color) | |
| Calcining Temperature | Run A (no SiO$_2$) | Run B (SiO$_2$ added) |
| X° | medium red (arbitrary color rating = 100) 15% loss | lighter red (arbitrary color rating = 50) 15% loss |
| (X + 50)° | darker red rating = 150 10% loss | medium red rating = 75 10% loss |
| (X + 100)° | very dark red rating = 200 2% loss | medium dark red rating = 120 2% loss |

EXAMPLE 1

Normal commercial operation without the addition of SiO$_2$ is used in this context as example 1. The copperas as received contained some free sulfuric acid and approximately 0.4% TiO$_2$ in the form of titanyl sulfate, which had to be removed. The copperas was dissolved in water continuously at about 150° F. (65° C.) forming a 40–45 wt. % solution. This solution entered continuously a series of tanks filled with an excess of scrap iron. On contact with scrap, the acid was neutralized and formed more ferrous sulfate. When the pH of the solution approached a value of 4, the titanium precipitated out as a hydrated titanium oxide. The turbid solution was separated in a conventional clarifier, with the underflow sludge containing most of the impurities and the overflow consisting of the clear, purified ferrous sulfate solution. This solution was sprayed into a fluid bed dryer at a rate of 15 to 17 gpm. The material leaving this dryer comprised dry, partially dehydrated ferrous sulfate monohydrate particles, which represent the feed-stock for the calciner. The material was calcined at 1350° F. (732° C.) for about 4 hours, and samples were saved for later color comparison.

EXAMPLE 2

This example was identical in procedure to Example 1 up to the point prior to the purified copperas solution entering the fluid-bed dryer. At this point a slurry of 7% Cab-O-Sil M-5 (fumed silica produced by Cabot Corp.) in water was added to the copperas solution at a rate of 0.2 gpm by a metering pump. During the course of the experiments, samples were collected to determine when the treated material had replaced the untreated residual materials in the system. When the silica content of the product had reached 0.33 to 0.36 wt. %, based on the iron oxide, a sample was taken, to be compared with a sample from Ex. 1.

It was found that although the calciner was operated under the same conditions as in Example 1, the samples of Example 2 were consistently lighter in mass-tone, by visual measurements. The improvement in tinting strength, measured visually, using samples from Ex. 1 and Ex. 2, was found to be slightly more than 5%, at the approximately 0.35 wt. % level of $SiO_2$ added. Since both examples had the same calcining temperature, the losses were comparable.

Further runs, using additions of $SiO_2$ up to about 6 wt. %, based on the resultant $Fe_2O_3$ product, led to similar improvements in the color properties. And it was found that where the addition of $SiO_2$ gave a lighter red, to bring the color to the target shade (a medium red), a higher calcining temperature was necessary. And this higher temperature resulted in improved throughput and lower losses due to uncalcined iron salt.

While the present invention has been described herein with reference to particular embodiments thereof, it will be appreciated by those skilled in the art at various changes and modifications can be made without departing from the scope of the invention as set forth.

I claim

1. A method of improving the calcining effect of synthetic iron oxide prepared from purified soluble iron salts, comprising the steps of:
   (a) adding a silica-containing material selected from the group consisting fumed silica and precipitated silica to the soluble iron salt solution, the amount of silica-containing material varying from about 0.25 to about 10 wt. %, based upon the weight of the resultant iron oxide product, and the particle range of the added silica-containing material being 4–20 millimicrons,
   (b) drying the mixture, and
   (c) calcining the mixture of step (b) at a temperature range of about 1325°–1600° F. (718°–871° C.).

2. The method of claim 1, wherein:
   (a) the soluble iron salt is copperas,
   (b) the amount of silica-containing material varies from about 0.4 to about 6 wt. %,
   (c) the particle size of the added silica-containing material is about 10 millimicrons,
   (d) the resultant calcined material having the added silica shows an increased tinting strength of about 5%, and
   (e) the calcined material having the added silica produces a product that is lighter in mass-tone, compared with the calcined material having no added silica that gives a standard mass-tone, with the result that a lighter-mass-tone products, when calcined at a higher temperature to give the standard mass-tone, have lower losses of uncalcined iron salt.

3. The method of claim 2 wherein the amount of silica-containing material varies from about 0.5 to about 1.5 wt. %.

* * * * *